US011693854B2

(12) United States Patent
Nishida et al.

(10) Patent No.: US 11,693,854 B2
(45) Date of Patent: Jul. 4, 2023

(54) QUESTION RESPONDING APPARATUS, QUESTION RESPONDING METHOD AND PROGRAM

(71) Applicant: NIPPON TELEGRAPH AND TELEPHONE CORPORATION, Tokyo (JP)

(72) Inventors: Kyosuke Nishida, Tokyo (JP); Atsushi Otsuka, Tokyo (JP); Itsumi Saito, Tokyo (JP); Hisako Asano, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 428 days.

(21) Appl. No.: 17/049,544

(22) PCT Filed: Mar. 27, 2019

(86) PCT No.: PCT/JP2019/013069
§ 371 (c)(1),
(2) Date: Oct. 21, 2020

(87) PCT Pub. No.: WO2019/208070
PCT Pub. Date: Oct. 31, 2019

(65) Prior Publication Data
US 2021/0256018 A1 Aug. 19, 2021

(30) Foreign Application Priority Data
Apr. 23, 2018 (JP) .................................. 2018-082521

(51) Int. Cl.
*G06F 16/332* (2019.01)
*G06F 16/245* (2019.01)
(Continued)

(52) U.S. Cl.
CPC ........ *G06F 16/245* (2019.01); *G06F 16/3329* (2019.01); *G06F 40/289* (2020.01); *G06N 3/044* (2023.01); *G06N 3/08* (2013.01)

(58) Field of Classification Search
CPC .............................. G06F 16/3329; G06N 3/08
See application file for complete search history.

(56) References Cited

U.S. PATENT DOCUMENTS

2008/0201132 A1* 8/2008 Brown ................ G06F 16/3329
704/9
2014/0316768 A1* 10/2014 Khandekar ......... G06F 16/3329
704/9

(Continued)

FOREIGN PATENT DOCUMENTS

CN 108415977 A * 8/2018 ......... G06F 16/3329
CN 108733742 A * 11/2018 ......... G06F 17/2785

(Continued)

OTHER PUBLICATIONS

Tan, Chuanqi, et al., "S-Net: From Answer Extraction to Answer Generation for Machine Reading Comprehension," arXiv:1706.04815v6 [cs.CL] Jan. 2, 2018.

*Primary Examiner* — James E Richardson

(57) ABSTRACT

This disclosure is provided, in which an answer generation unit configured to receive a document and a question as inputs, and execute processing of generating an answer sentence for the question by a learned model by using a word included in a union of a predetermined first vocabulary and a second vocabulary composed of words included in the document and the question, in which the learned model includes a learned neural network that has been learned in advance whether word included in the answer sentence is included in the second vocabulary, and increases or decreases a probability at which a word included in the second vocabulary is selected as the word included in the (Continued)

answer sentence at the time of generating the answer sentence by the learned neural network.

20 Claims, 6 Drawing Sheets

(51) Int. Cl.
*G06F 40/289* (2020.01)
*G06N 3/08* (2023.01)
*G06N 3/044* (2023.01)

(56) References Cited

U.S. PATENT DOCUMENTS

2015/0026106 A1* 1/2015 Oh .................. G06F 40/205
706/12
2016/0350653 A1* 12/2016 Socher ................ G06N 5/04

FOREIGN PATENT DOCUMENTS

CN 108763535 A * 11/2018
JP 2006072787 A * 3/2006

* cited by examiner

QUESTION RESPONDING APPARATUS, QUESTION RESPONDING METHOD AND PROGRAM

CROSS-REFERENCE TO RELATED APPLICATIONS

This application is a U.S. 371 Application of International Patent Application No. PCT/JP2019/013069, filed on 27 Mar. 2019, which application claims priority to and the benefit of JP Application No. 2018-082521, filed on 23 Apr. 2018, the disclosures of which are hereby incorporated herein by reference in their entireties.

TECHNICAL FIELD

The present disclosure relates to a question answering apparatus, a question answering method, and a program.

BACKGROUND ART

If "reading comprehension" for generating an answer sentence for a given document and question can be accurately performed by artificial intelligence, it can be applied to a wide range of services such as a question answering and an intelligent agent.

As a technology in related art for reading comprehension, there is a technology disclosed in, for example, Non Patent Literature 1. In the technology in related art disclosed in Non Patent Literature 1 and the like, for example, a word sequence of a document and a question is encoded (vectorized), and a vector expression of each word sequence is matched, and then, an answer is generated based on a content of the document.

CITATION LIST

Non Patent Literature

Non Patent Literature 1: Chuanqi Tan, Furu Wei, Nan Yang, Weifeng Lv, Ming Zhou: S-Net: From Answer Extraction to Answer Generation for Machine Reading Comprehension. CoRR abs/1706.04815 (2017)

SUMMARY OF THE INVENTION

Technical Problem

On the other hand, in reading comprehension, words included in answers are often included in questions and documents. However, in the technology in related art disclosed in Non Patent Literature 1 and the like, an answer is generated from words included in a specific vocabulary (for example, a vocabulary composed of words frequently appearing in a general document). Accordingly, if a word that is not included in the vocabulary (for example, a word such as a proper noun or a technical term) exists in the document, the word is treated as an unknown word, and a highly accurate answer sentence may not be obtained.

An embodiment of the present disclosure has been made in view of the above points, and has an object to provide a highly accurate answer to a question.

Means for Solving the Problem

To achieve the above object, an embodiment of the present invention includes an answer generation unit configured to receive a document and a question as inputs, and execute processing of generating an answer sentence for the question by a learned model by using a word included in a union of a predetermined first vocabulary and a second vocabulary composed of words included in the document and the question, in which the learned model includes a learned neural network that has been learned in advance whether a word included in the answer sentence is included in the second vocabulary, and increases or decreases a probability at which a word included in the second vocabulary is selected as the word included in the answer sentence at the time of generating the answer sentence by the learned neural network.

Effects of the Invention

A highly accurate answer to a question can be realized.

DESCRIPTION OF EMBODIMENTS

Figure 1:
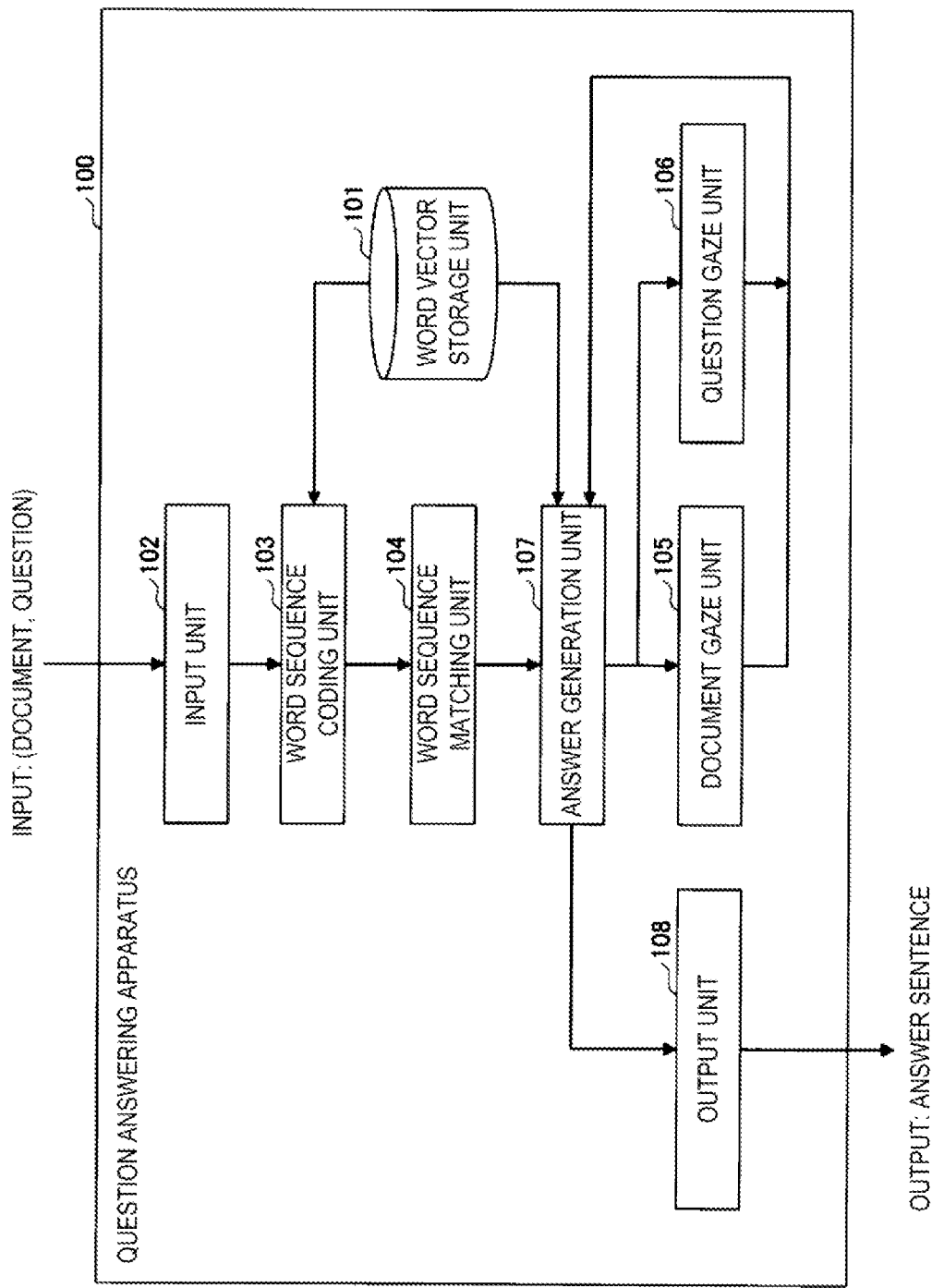
FIG. 1 is a diagram illustrating an example of a functional configuration of a question answering apparatus at the time of answering to a question in an embodiment of the present disclosure.

An embodiment of the present disclosure will be described below with reference to the drawings. Hereinafter, a description will be given of a question answering apparatus 100 that provides a highly accurate answer to a question by accurately including words included in a given document and question in an answer sentence.

The embodiment described below is merely an example, and the embodiment to which the present disclosure is applied is not limited to the following embodiment. For example, a technology according to the embodiment of the present disclosure can be used for question answering related to a specialized document, but is not limited to this, and can be used for various cases.

Overview

In the embodiment of the present disclosure, when an arbitrary document and an arbitrary question sentence (hereinafter, simply referred to as "question") for the document are given, the question answering apparatus 100 uses a sentence generation technology by a neural network to generate a word string that is an answer sentence for the document and the question. At this time, according to the embodiment of the present disclosure, not only a specific vocabulary (for example, a vocabulary composed of words frequently appearing in a general document, which is a vocabulary V described later) but also a vocabulary (vocabulary B described later) composed of words included in the document and the question that are given to the question answering apparatus 100 is used to generate an answer sentence to the question. By outputting the answer sentence, question answering to the given document and question is performed.

More specifically, in the embodiment of the present disclosure, when words included in an answer sentence are generated by a neural network, an appearance probability of a word included in a document and a question is increased or decreased. Accordingly, in the embodiment of the present disclosure, the word included in the document and the question can be accurately included in the answer sentence.

Additionally, in the embodiment of the present disclosure, in order to generate the answer sentence mentioned above, a neural network that identifies whether the word included in an answer sentence is included in the given document or question is learned.

Here, in the embodiment of the present disclosure, a vocabulary composed of words frequently appearing in a general document is represented as "V", and a vocabulary composed of words appearing in the document and the question given to the question answering apparatus 100 is represented as "B". Additionally, a vocabulary represented by a union of the vocabulary V and a vocabulary B is represented as "V'".

The vocabulary V can be constituted with, for example, a set of words that are tens of thousands to hundreds of thousands of words with top high frequencies of occurrence, among words appearing in a general document set such as a large text set. Additionally, the vocabulary B can be constituted with, for example, a set of words appearing in the document and the question given to the question answering apparatus 100. Note that the vocabulary V' also includes special words (for example, <s> and </s>) representing the beginning or the end of a document.

Functional Configuration of Question Answering Apparatus 100

First, a functional configuration of the question answering apparatus 100 at the time of question answering in the embodiment of the present disclosure will be described with reference to FIG. 1. FIG. 1 is a diagram illustrating an example of a functional configuration of the question answering apparatus 100 at the time of question answering in an embodiment of the present disclosure.

As illustrated in FIG. 1, the question answering apparatus 100 at the time of question answering includes a word vector storage unit 101, an input unit 102, a word sequence coding unit 103, a word sequence matching unit 104, a document gaze unit 105, a question gaze unit 106, and an answer generation unit 107, and an output unit 108.

Figure 2:
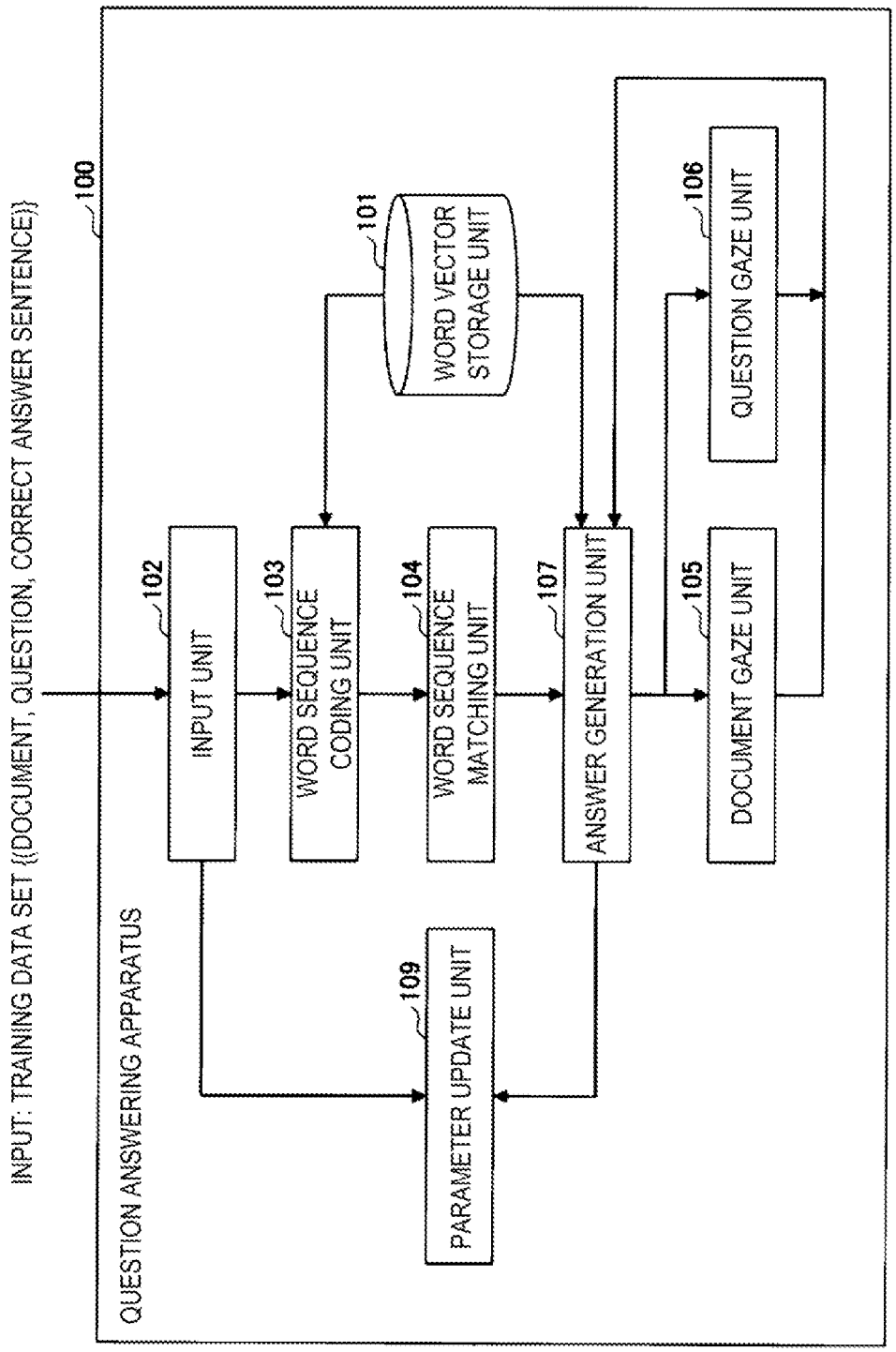
FIG. 2 is a diagram illustrating an example of a functional configuration of the question answering apparatus at the time of learning according to the embodiment of the present disclosure.

Additionally, a functional configuration of the question answering apparatus 100 at the time of learning according to the embodiment of the present disclosure will be described with reference to FIG. 2. FIG. 2 is a diagram illustrating an example of a functional configuration of the question answering apparatus 100 at the time of learning according to the embodiment of the present disclosure.

As illustrated in FIG. 2, the question answering apparatus 100 at the time of learning differs from the function configuration of the question answering apparatus 100 at the time of question answering in that a parameter update unit 109 is included without the output unit 108. Other functional configurations of the question answering apparatus 100 at the time of learning are the same as the functional configurations of the question answering apparatus 100 at the time of question answering. However, the question answering apparatus 100 at the time of learning may include the output unit 108. That is, the question answering apparatus 100 at the time of learning may have a functional configuration obtained by adding the parameter update unit 109 to the functional configuration of the question answering apparatus 100 at the time of question answering.

The word vector storage unit 101 stores a set of a word and a word vector representing the word as a vector. Hereinafter, it is assumed that the number of dimensions of the word vector is E dimensions. A set of a word and a word vector can be generated by, for example, a method disclosed in Reference 1 below. Note that E may be set as, for example, E=300.

Reference 1

Thomas Mikolov, Ilya Sutskever, Kai Chen, Greg Corrado, and Jeffrey Dean. Distributed Representations of Words and Phrases and their Compositionality. In Proceedings of NIPS, 2013.

Figures 3, 4:
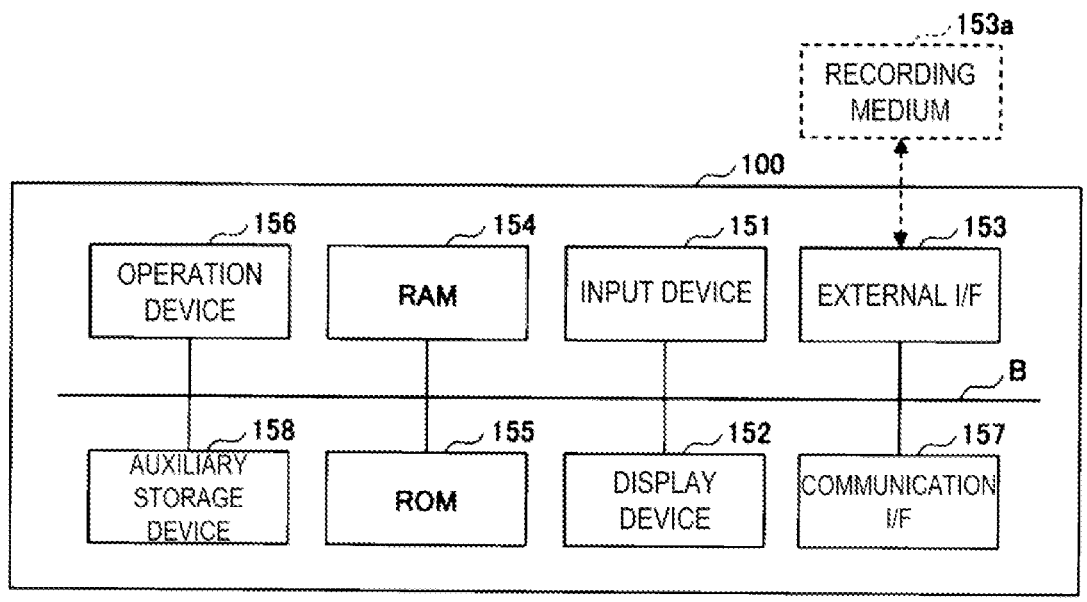
FIG. 3 is a diagram illustrating an example of data stored in a word vector storage unit.
FIG. 4 is a diagram illustrating an example of a hardware configuration of a question answering apparatus according to the embodiment of the present disclosure.

Here, an example of data (a set of a word and a word vector) stored in the word vector storage unit 101 is illustrated in FIG. 3. FIG. 3 is a diagram illustrating an example of data stored in the word vector storage unit 101. As illustrated in FIG. 3, in the word vector storage unit 101, for example, a word such as "go", "write", and "baseball" is associated with a word vector representing the word as a vector.

It is assumed that a word vector of a word not stored in the word vector storage unit 101 is an E-dimensional zero vector. Additionally, it is assumed that a word vector of a special word "PAD" used for padding when creating a vector sequence of a predetermined length is a zero vector with E dimensions.

The input unit 102 inputs the document and the question given at the time of question answering. Additionally, at the time of learning, the input unit 102 inputs a training data set (that is, a set (data set) constituted with training data, which is a set of a document, a question, and a correct answer sentence).

The word sequence coding unit 103 converts a sequence of each word (hereinafter, referred to as a "word sequence") included in the document input by the input unit 102 into a vector sequence (hereinafter, referred to as a "first document vector sequence") in which each word constituting the word sequence is represented by a vector, respectively. Additionally, the word sequence coding unit 103 converts the first document vector sequence into a second document vector sequence using an encoder based on a neural network.

The word sequence coding unit 103 converts a word sequence included in the question input by the input unit 102 into a vector sequence (hereinafter, referred to as a "first question vector sequence") in which each word constituting the word sequence is represented by a vector, respectively. Additionally, the word sequence coding unit 103 converts the first question vector sequence into a second question vector sequence using an encoder based on a neural network.

The word sequence matching unit 104 calculates a matching matrix for the second document vector sequence and the second question vector sequence obtained by the word sequence coding unit 103.

The document gaze unit 105 calculates a gaze of each word included in the document by using the matching matrix calculated by the word sequence matching unit 104.

The question gaze unit 106 calculates a gaze of each word included in the question by using the matching matrix calculated by the word sequence matching unit 104.

The answer generation unit 107 uses a decoder in accordance with a neural network, a gaze distribution of each word included in the document calculated by the document gaze unit 105 (hereinafter, referred to as "gaze distribution"), a gaze distribution of each word included in the question calculated by the question gaze unit 106, and a probability distribution of a word included in the vocabulary V to calculate a score at which each word included in the vocabulary V' is selected as a word included in the answer sentence. Then, the answer generation unit 107 selects each word included in the answer sentence from the vocabulary V' using the score calculated at the time of question answering. Accordingly, the answer sentence is generated.

The output unit 108 outputs the answer sentence generated by the answer generation unit 107 at the time of question answering. An output destination of the answer sentence is not limited. The output destination of the answer sentence includes, for example, a display device such as a display, an auxiliary storage device such as a Hard Disk Drive (HDD), a voice output apparatus such as a speaker, and other apparatuses connected via a communication network.

At the time of learning, the parameter update unit 109 calculates a loss using a probability distribution indicating the score calculated by the answer generation unit 107 and the correct answer sentence input by the input unit 102. Then, the parameter update unit 109 uses the loss to update a parameter by an arbitrary optimization method. Accordingly, a neural network for generating the word included in the answer sentence is learned.

After the parameter is updated using the training data set, the question answering apparatus 100 may use a document and a question not included in the training data set (data indicating the document and the question not included in the training data set is also referred to as "test data") to perform evaluation for a recognition accuracy of the learned neural network (i.e., evaluation related to an accuracy of the answer sentence generated by the answer generation unit 107).

Hardware Configuration of Question Answering Apparatus 100

Next, a hardware configuration of the question answering apparatus 100 according to the embodiment of the present disclosure will be described with reference to FIG. 4. FIG. 4 is a diagram illustrating an example of a hardware configuration of the question answering apparatus 100 according to the embodiment of the present disclosure.

As illustrated in FIG. 4, the question answering apparatus 100 according to the embodiment of the present disclosure includes an input device 151, a display device 152, an external I/F 153, a Random Access Memory (RAM) 154, a Read Only Memory (ROM) 155, an operation device 156, a communication I/F 157, and an auxiliary storage device 158. Each of these pieces of hardware is communicably connected respectively via a bus B.

The input device 151 is, for example, a keyboard, a mouse, a touch panel and the like, and is used by a user to input various operations. The display device 152 is, for example, a display, and displays a processing result of the question answering apparatus 100 (for example, an answer sentence to a question). Note that the question answering apparatus 100 does not need to include at least one of the input device 151 and the display device 152.

The external I/F 153 is an interface with an external apparatus. The external apparatus includes a recording medium 153a and the like. The question answering apparatus 100 can read and write the recording medium 153a and the like via the external I/F 153. The recording medium 153a may record at least one program and the like that realizes each functional unit included in the question answering apparatus 100.

Examples of the recording medium 153a include a floppy disk, a Compact Disc (CD), a Digital Versatile Disk (DVD), a Secure Digital memory card (SD memory card), and a Universal Serial Bus (USB) memory card.

The RAM 154 is a volatile semiconductor memory that temporarily stores a program and data. The ROM 155 is a non-volatile semiconductor memory that can retain a program and data even when the power is turned off. The ROM 155 stores, for example, settings related to an operating system (OS) and settings related to a communication network.

The operation device 156 is, for example, a central processing unit (CPU) or a graphics processing unit (GPU), and reads a program or data from the ROM 155, the auxiliary storage device 158 and the like onto the RAM 154 to execute processing. Each functional unit included in the question answering apparatus 100 works by, for example, processing in which at least one program stored in the auxiliary storage device 158 is executed by the operation device 156. Note that the question answering apparatus 100 may include both the CPU and the GPU as the operation device 156, or include only one of the CPU and the GPU.

The communication I/F 157 is an interface to connect the question answering apparatus 100 to a communication network. At least one program realizing each functional unit included in the question answering apparatus 100 may be acquired (downloaded) from a predetermined server apparatus and the like via the communication I/F 157.

The auxiliary storage device 158 is, for example, an HDD or a solid state drive (SSD), and is a non-volatile storage apparatus that stores a program and data. The programs and data stored in the auxiliary storage device 158 include, for example, an OS and at least one program that realizes each functional unit included in the question answering apparatus 100.

The question answering apparatus 100 according to the embodiment of the present disclosure has the hardware configuration illustrated in FIG. 4 and thus can perform various processing described below. In the example illustrated in FIG. 4, a case has been described where the question answering apparatus 100 according to the embodiment of the present disclosure is achieved by one apparatus (computer), but the present disclosure is not limited to this. The question answering apparatus 100 according to the embodiment of the present disclosure may be achieved by a plurality of apparatuses (computers).

Learning Processing

Figure 5:
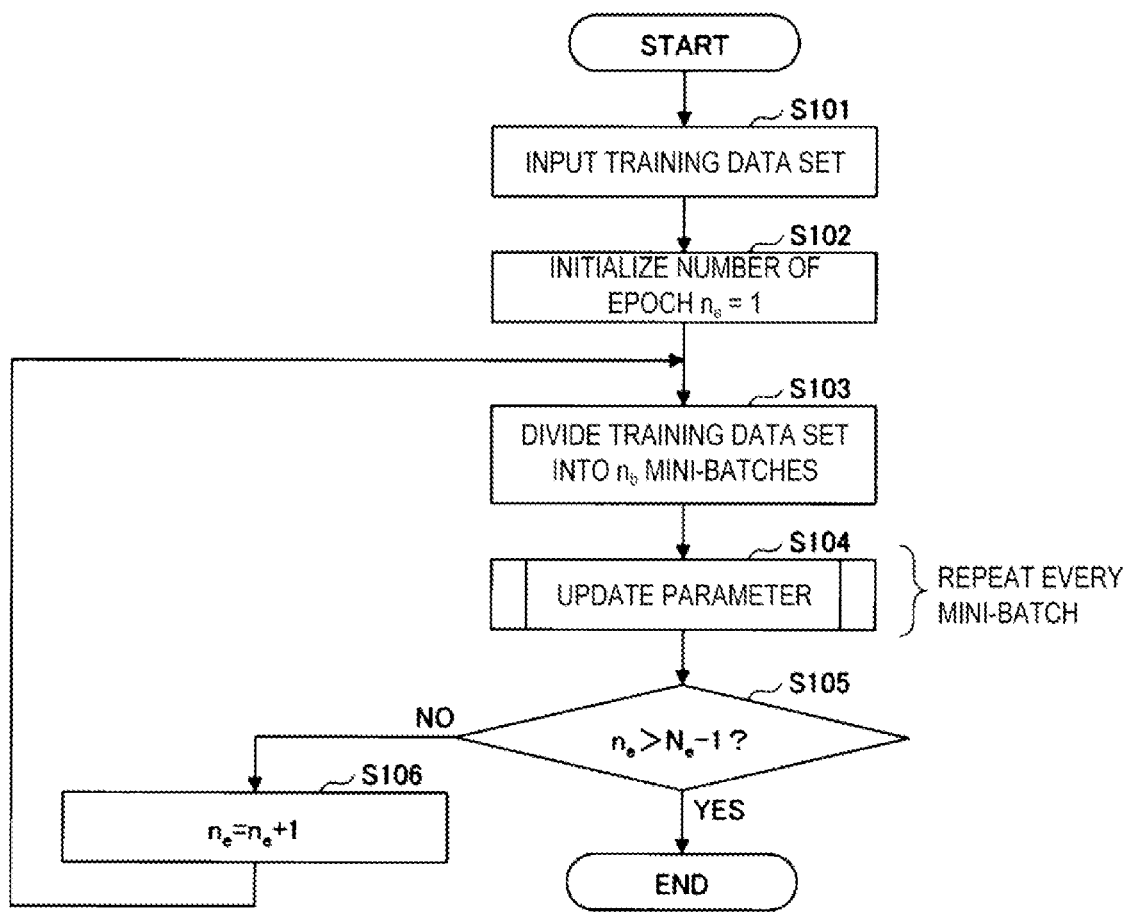
FIG. 5 is a flowchart illustrating an example of learning processing according to the embodiment of the present disclosure.

Hereinafter, learning processing executed by the question answering apparatus 100 according to the embodiment of the present disclosure will be described with reference to FIG. 5. FIG. 5 is a flowchart illustrating an example of learning processing according to the embodiment of the present disclosure. As described above, the question answering apparatus 100 at the time of learning includes each functional unit illustrated in FIG. 2.

Step S101: The input unit 102 inputs a training data set. The input unit 102 may, for example, input a training data set stored in the auxiliary storage device 158, the recording medium 153 and the like, or may input a training data set acquired (downloaded) from a predetermined server apparatus and the like via the communication I/F 157.

Step S102: The input unit 102 initializes a number of epoch $n_e$ indicating a number of times of learning for the training data set, to 1. The maximum value of the number of epoch $n_e$ is assumed to be a hyper parameter, $N_e$. $N_e$ may be set as, for example, $N_e=15$.

Step S103: The input unit 102 divides the training data set into $N_b$ mini-batches. The division number $N_b$ of the mini-batches is a hyper parameter. The $N_b$ may be set as, for example, $N_b=60$.

Step S104: The question answering apparatus 100 repeatedly executes parameter update processing for each of $N_b$ mini-batches. That is, the question answering apparatus 100 calculates a loss using the mini-batch, and then updates the parameter by an arbitrary optimization method using the calculated loss. The details of the parameter update processing will be described later.

Step S105: The input unit 102 judges whether the number of epoch $n_e$ is greater than $N_e-1$. When the epoch number $n_e$ is not judged to be greater than $N_e-1$, the question answering apparatus 100 executes processing of step S106. On the other hand, when the number of epoch $n_e$ is judged to be greater than $N_e-1$, the question answering apparatus 100 ends learning processing.

Step S106: The input unit 102 adds "1" to the number of epoch $n_e$. Then, the question answering apparatus 100 executes the processing of step S103. Accordingly, the processing of step S103 and step S104 is repeatedly executed $N_e$ times using the training data set input in step S101.

Parameter Update Processing

Figure 6:
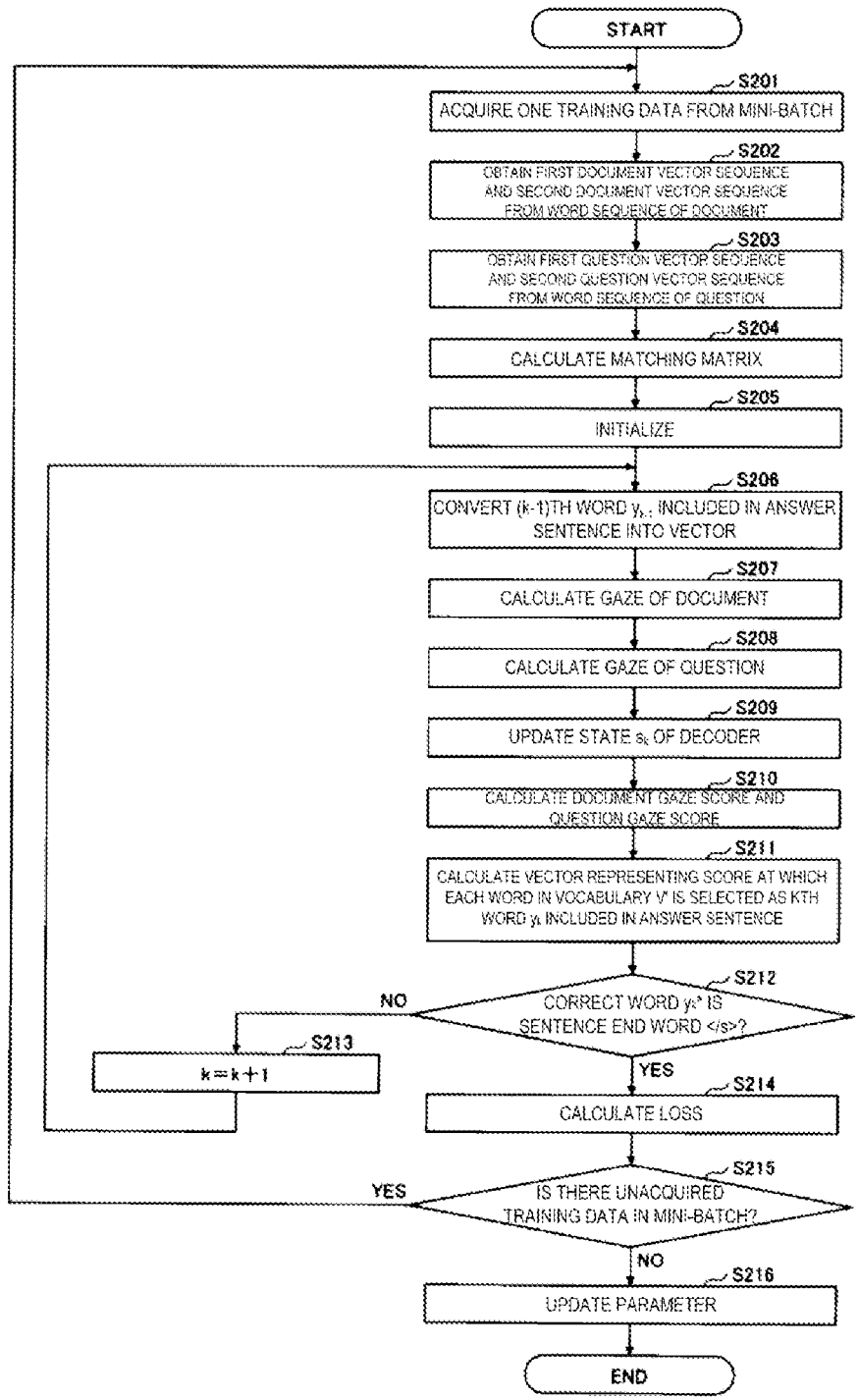
FIG. 6 is a flowchart illustrating an example of parameter update processing according to the embodiment of the present disclosure.

Here, the parameter update processing in step S104 will be described with reference to FIG. 6. FIG. 6 is a flowchart illustrating an example of the parameter update processing according to the embodiment of the present disclosure. Hereinafter, the parameter update processing will be described with reference to certain one mini-batch of $N_b$ mini-batches.

Step S201: The input unit 102 acquires one training data from the mini-batch. Note that the training data is a set of a document, a question, and a correct answer sentence (that is, data represented by (the document, the question, the correct answer sentence)). Hereinafter, when a "document", a "question", and a "correct answer sentence" are represented, it is assumed that they indicate the document, the question, and the correct answer sentence included in the training data acquired in step S201, respectively.

Step S202: The word sequence coding unit 103 obtains a first document vector sequence X and a second document vector sequence H by the following step S202-1 and step S202-2.

Step S202-1: The word sequence coding unit 103 searches the word vector storage unit 101 for each word included in the word sequence $(x_1, x_2, \ldots, x_T)$ from the beginning of the document to the T-th one and converts each word, $x_t$ (t=1, 2, ..., T) into a word vector $e_t$, respectively. Then, the word sequence coding unit 103 obtains the first document vector sequence X=$[e_1\ e_2 \ldots e_T] \in R^{E \times T}$ by using the word vector $e_t$ (t=1, 2, ..., T) as a vector sequence. Accordingly, the word sequence $(x_1, x_2, \ldots, x_T)$ of the document is converted into the first document vector sequence X. Here, T is a length of the word sequence, and for example, T may be equal to 400.

When the length of the word sequence of the document is less than T, padding is performed with the special word "PAD". On the other hand, when the length of the word sequence of the document exceeds T, the word sequence in the excess portion is ignored.

Step S202-2: The word sequence coding unit 103 converts the first document vector sequence X into the second document vector sequence of 2d×T, H=$[H_1, H_2, \ldots, H_T]$ by using an encoder in accordance with a neural network. Here, a bidirectional Long short-term memory (LSTM) disclosed in Reference 2 below is used as the encoder, for example, where a size of a hidden state is d. Note that d may be set as, for example, d=100.

Reference 2

Hochreiter, S., and Schmidhuber, J. 1997. Long short-term memory. Neural Computation 9(8):1735-1780.

Step S203: The word sequence coding unit 103 obtains a first question vector sequence Q and a second question vector sequence U by the following step S203-1 and step S203-2.

Step S203-1: The word sequence coding unit 103 searches the word vector storage unit 101 for each word included in the word sequence $(q_1, q_2, \ldots, q_J)$ from the beginning of the document to the J-th one and converts each word, $q_j$ (j=1, 2, ..., J) into a word vector $e_j$, respectively. Then, the word sequence coding unit 103 obtains the first question vector sequence Q=$[e_1\ e_2 \ldots e_J] \in R^{E \times J}$ by using the word vector $e_j$ (j=1, 2, ..., J) as a vector sequence. Accordingly, the word sequence $(q_1, q_2, \ldots, q_J)$ of the question is converted into the first question vector sequence Q. Here, J is a length of the word sequence, and for example, T may be equal to 30.

When the length of the word sequence of the question is less than J, padding is performed with the special word "PAD". On the other hand, when the length of the word sequence of the document exceeds J, the word sequence in the excess portion is ignored.

Step S203-2: The word sequence coding unit 103 converts the second question vector sequence Q into the second question vector sequence of 2d×J, U=$[U_1, U_2, \ldots, U_J]$ using the encoder by the neural network. Note that the encoder uses the bidirectional LSTM in which the size of the hidden state is d, as in step S202-2.

Step S204: The word sequence matching unit 104 calculates the matching matrix $M^H$ and $M^U$ by the following step S204-1 to step S204-4.

Step S204-1: The word sequence matching unit 104 calculates a matching matrix S using the second document vector sequence H and the second question vector sequence U. Each element $S_{tj}$ of the matching matrix S is calculated by the following equation.

$$S_{tj} = w_s^\tau [H_t; U_j; H_t \circ U_j] \in R \quad \text{[Math. 1]}$$

Here, $\tau$ represents transposition, circle ($\circ$) represents a product of each vector element, and semicolon (;) represents concatenation of vectors. Additionally, $w_s \in R^{6d}$ is a parameter of a neural network to be learned (that is, a neural network functioning as an encoder).

Step S204-2: The word sequence matching unit 104 uses the second document vector sequence H, the second question vector sequence U, and the matching matrix S to calculate attention-weighted average vectors $U_j^\sim$ and $H_t^\sim$. For convenience of the description, in the text of the disclosure, "X with a wavy line attached to the top" is designated as $X^\sim$.

The attention-weighted average vectors $U_j^\sim$ and $H_t^\sim$ are calculated respectively by the corresponding one of the following equations.

$$\tilde{U}_j = \sum_{t=1}^{T} \alpha_{jt}^H H_t \in R^{2d} \quad \text{[Math. 2]}$$

-continued $$\tilde{H}_t = \sum_{j=1}^{J} \alpha_{tj}^U U_j \in R^{2d}$$

Here, $$\alpha_j^H = \text{softmax}_t(S_j) \in R^T, \alpha_t^U = \text{softmax}_j(S_t) \in R^J \quad \text{[Math. 3]}$$

Additionally, $S_j$ represents a column vector in the j-th column of the matching matrix S, and $S_t$ represents a row vector of the t-th row of the matching matrix S.

Step S204-3: The word sequence matching unit 104 calculates vector sequences $G^U$ and $G^H$. The vector sequences $G^U$ and $G^H$ is calculated respectively by the corresponding one of the following equations.

$$G^H = [H; \tilde{H}; H \circ \tilde{H}] \in R^{6d \times T}$$

$$G^U = [U; \tilde{U}; U \circ \tilde{U}] \in R^{6d \times J} \quad \text{[Math. 4]}$$

Step S204-4: The word sequence matching unit 104 converts the vector sequences $G^U$ and $G^H$ into matching matrixes $M^H \in R^{2d \times T}$ and $M^U \in R^{2d \times J}$, respectively, by the bidirectional LSTM of a single layer with the size of the hidden state as d.

Step S205: The answer generation unit 107 initializes the index k of the word $y_k$ included in the answer sentence to k=1 and initializes the initial state $s_0 \in R^{2d}$ of the decoder by the neural network with a zero vector. Additionally, the answer generation unit 107 sets the 0-th word $y_0$ that is included in the answer sentence, with a special word <s> which represents the beginning of a sentence. Here, as the decoder, a neural network such as recurrent neural network (RNN) or LSTM which is a type of RNN is used. Hereinafter, the word $y_k$ included in the answer sentence is also represented as the "output word $y_k$".

Step S206: The answer generation unit 107 searches the word vector storage unit 101 for the output word $y_{k-1}$, and converts the output word $y_{k-1}$ into the word vector $z_{k-1}$ of E-dimension.

Step S207: The document gaze unit 105 uses the state $s_{k-1}$ of the decoder to calculate a gaze $c_k^H$ of each word included in the document by the following equations.

$$v_{kt} = F(M_t^H, s_{k-1}) \in R \quad \text{[Math. 5]}$$

$$\beta_{kt}^H = \frac{v_{kt}}{\sum_{t'=1}^{T} v_{kt'}}$$

$$c_k^H = \sum_{t=1}^{T} \beta_{kt}^H M_t^H \in R^{2d}$$

Here, a score function F uses an inner product $(M_t^H \cdot s_{k-1})$. Note that, as the score function F, a biliner, a multilayer perceptron and the like may be used.

Step S208: The question gaze unit 106 uses the state $s_{k-1}$ of the decoder to calculate a gaze $c_k^U$ of each word included in the question by the following equations.

$$v_{kj} = F(M_t^U, s_{k-1}) \in R \quad \text{[Math. 6]}$$

$$\beta_{kj}^U = \frac{v_{kj}}{\sum_{j'=1}^{J} v_{kj'}}$$

-continued $$c_k^U = \sum_{j=1}^{J} \beta_{kj}^U M_j^U \in R^{2d}$$

Here, the score function F uses an inner product $(M_t^U \cdot s_{k-1})$. Note that, as the score function F, a biliner, a multilayer perceptron and the like may be used.

Step S209: The answer generation unit 107 updates the state $s_k$ of the decoder by the following equation.

$$s_k = f(s_{k-1}, [z_{k-1}; c_k^H; c_k^U]) \quad \text{[Math. 7]}$$

Here, a neural network such as LSTM is used as the function f of the decoder as described above. The neural network functioning as the decoder is to be learned. Note that the RNN other than the LSTM may be used as the decoder.

Step S210: The answer generation unit 107 calculates the document gaze score $\lambda^H$ and the question gaze score $\lambda^U$ respectively by the corresponding one of the following equations.

$$\lambda^H = \text{sigmoid}(w^H \cdot s_{k-1})$$

$$\lambda^U = \text{sigmoid}(w^U \cdot s_{k-1}) \quad \text{[Math. 8]}$$

Here, $w^H \in R^{2d}$ and $w^U \in R^{2d}$ are parameters of the neural network to be learned (that is, a neural network functioning as a decoder).

Step S211: The answer generation unit 107 calculates a vector $o_k$ representing the score at which each word in the vocabulary V' is selected as the output word $y_k$.

Here, it is assumed the number of words included in the vocabulary V' is represented as N, and the score at which the n-th word included in the vocabulary V' is selected as the output word $y_k$ is represented as $o_{k,n}$. In this case, the vector $o_k$ can be represented as $o_k = (o_{k,1}, o_{k,2}, \ldots, o_{k,N})$.

Additionally, it is assumed that the greater the $o_{k,n}$, the more easily the n-th word included in the vocabulary V' is selected as the output word $y_k$. At this time, by performing normalization such that each $o_{k,n}$ is set as $0 \leq o_{k,n} \leq 1$ and the sum of each $o_{k,n}$ is set to 1, $o_k = (o_{k,1}, o_{k,2}, \ldots, o_{k,N})$ can be represented as a probability distribution $p(y_k|y_{<k}, X)$ of a conditional probability at which each word included in the vocabulary V' is selected as an output word $y_k$ when the output word is selected up to the (k−1)th one. By using the document gaze score $\lambda^H$ and the question gaze score $\lambda^U$, the probability distribution $p(y_k|y_{<k}, X)$ is calculated, for example, by the following equation.

$$p(y_k|y_{<k}, X) = \quad \text{[Math. 9]}$$
$$\lambda_{\max}\left(\frac{\lambda^H}{\lambda^U + \lambda^H} P_C^H(y_k|y_{<k}, X) + \frac{\lambda^U}{\lambda^U + \lambda^H} P_C^H(y_k|y_{<k}, X)\right) +$$
$$(1 - \lambda_{\max}) P_G(y_k|y_{<k}, X)$$

Here, it is assumed that $\lambda_{max} = \max(\lambda^H, \lambda^U)$. Additionally, $P_C^H$ which is a probability distribution based on the words included in the document and $P_C^U$ which is a probability distribution based on the words included in the question, are calculated, using a gaze distribution of the document and a gaze distribution of the question, respectively by the corresponding one of the following equations.

$$P_C^H(y_k|y_{<k},X) = \frac{1}{\sum_{k=1}^T \beta_{kt}^H} \sum_{t=1}^T \beta_{kt}^H \cdot I(y_k = x_t) \quad \text{[Math. 10]}$$

$$P_C^U(y_k|y_{<k},X) = \frac{1}{\sum_{j=1}^J \beta_{kj}^U} \sum_{j=1}^J \beta_{kj}^U \cdot I(y_k = q_j)$$

Here, I( . . . ) is a function that outputs 1 when the predicate is true and outputs 0 when the predicate is false.

Also, $P_G$ is the probability distribution based on the words included in the vocabulary V, and is calculated by the following equations.

$$P_G(y_k|y_{<k},X) \begin{cases} \frac{\exp(W_k \cdot \psi(s_k, y_{k-1} c_k))}{\sum_{k' \in V} \exp(W_{k'} \cdot \psi(s_k, y_{k-1}, c_k))} & \text{if } y_k \in V \\ 0 & \text{otherwise} \end{cases} \quad \text{[Math. 11]}$$

Here, as the function $\psi$, a neural network such as a multi-layer perceptron can be used. Additionally, $W \in R^{2d \times V}$ is a parameter of a neural network to be learned (that is, a neural network functioning as a function $\psi$).

Step S212: The answer generation unit 107 judges whether the word $y_k^*$ (that is, the correct word) corresponding to the output word $y_k$ among the words included in the correct answer sentence is a special word </s> representing the end of the sentence. When it is judged that the correct word $y_k^*$ is not the special word </s>, the question answering apparatus 100 executes processing of step S213. On the other hand, when it is judged that the correct word $y_k^*$ is the special word </s>, the question answering apparatus 100 executes processing of step S214.

Step S213: The answer generation unit 107 adds 1 to the index k of the output word $y_k$. Then, the answer generation unit 107 executes processing of step S206 by using the added k. Accordingly, the processing of step S206 to step S212 is repeatedly executed for each k (k=1, 2, . . . ) until the correct word $y_k^*$ is the special word </s>.

Step S214: The parameter update unit 109 calculates the loss L relating to the training data acquired in step S201. The loss L is calculated, using the correct answer sentence included in the training data, a constant ω, and the probability distribution p representing the score calculated by the answer generation unit 107, by the following equations.

$$L = L_G + \omega(L_H + L_U) \quad \text{[Math. 12]}$$

$$L_G = -\sum_k \ln(p(y_k^*|y_{<k}, X))$$

$$L_H = -\sum_k \lambda_k^{H*} \ln(\lambda_t^H) + (1 - \lambda_k^{H*}) \ln(1 - \lambda_k^H)$$

$$L_U = -\sum_k \lambda_k^{U*} \ln(\lambda_t^U) + (1 - \lambda_k^{U*}) \ln(1 - \lambda_k^U)$$

Here,
$y_k^*$ is the k-th word in the correct answer sentence,
$\lambda_k^{H*}$ is 1 when the k-th word of the correct answer sentence is included in the document, and is 0 otherwise, and
$\lambda_k^{U*}$ is 1 when the k-th word of the correct answer sentence is included in the question, and is 0 otherwise.
The constant ω may be set as, for example, ω=1.

Step S215: The input unit 102 judges whether the unacquired training data is in the mini-batch. When it is judged that the unacquired training data is in the mini-batch, the question answering apparatus 100 executes the processing of step S201. Accordingly, the processing of step S202 to step S214 is executed for each training data included in the mini-batch. On the other hand, when it is judged that the unacquired training data is not included in the mini-batch (that is, when the processing of step S202 to step S214 is executed on all the training data included in the mini-batch), the question answering apparatus 100 executes processing of step S216.

Step S216: The parameter update unit 109 calculates an average of each loss L calculated for each of the training data included in the mini-batch, and updates the parameter of the neural network to be learned by using the calculated average of the loss L, for example, by the stochastic gradient descent method. Note that the stochastic gradient descent method is an example of a parameter optimization method, and an arbitrary optimization method may be used. Accordingly, the parameter of the neural network to be learned is updated using one mini-batch.

Figure 7:
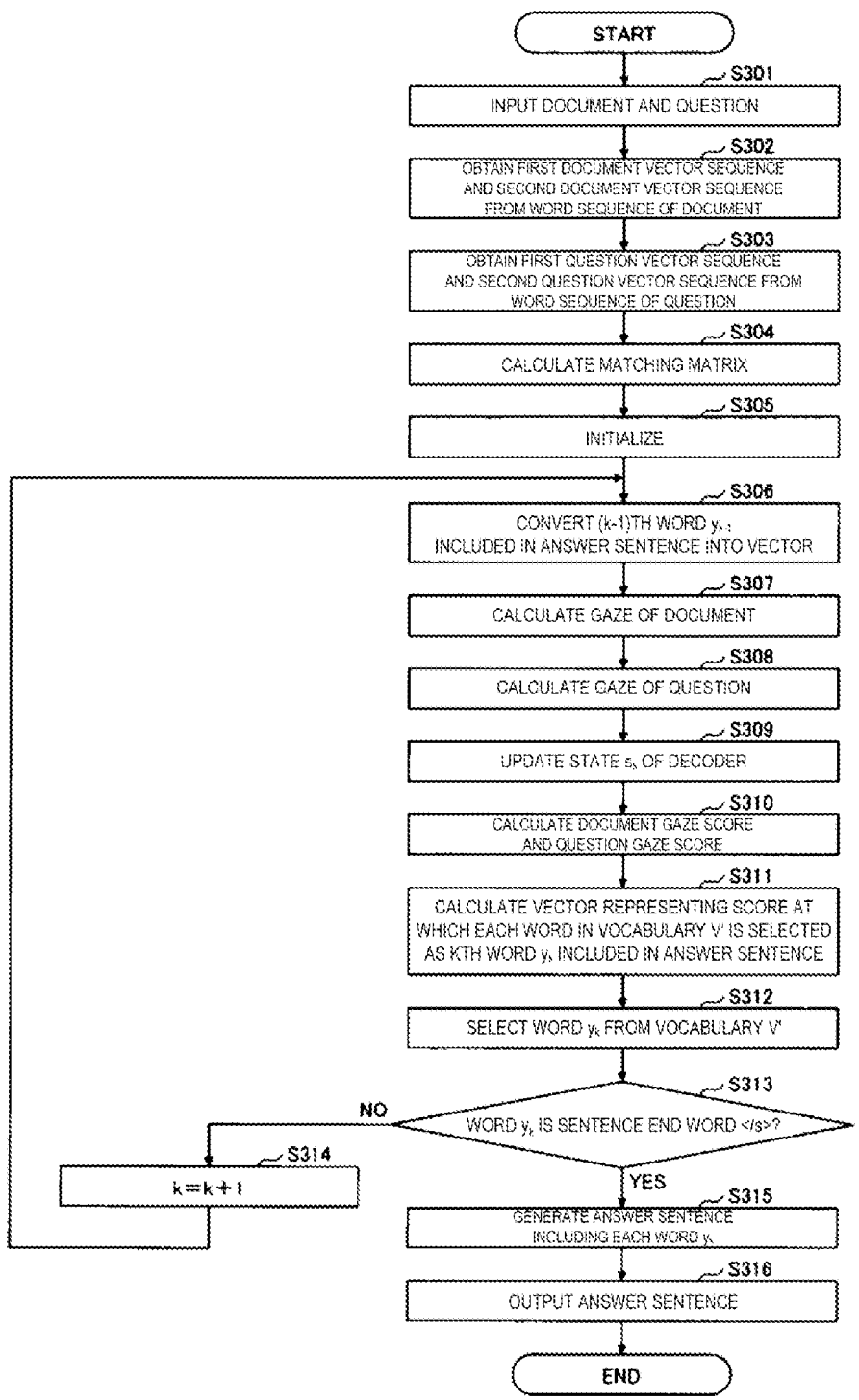
FIG. 7 is a flowchart illustrating an example of question answering processing according to the embodiment of the present disclosure.

Although the output word $y_k$ included in the answer sentence is not generated in the parameter updating processing described above, the output word $y_k$ may be generated by a method similar to step S312 in FIG. 7 described below.

Question Answering Processing

Hereinafter, question answering processing executed by the question answering apparatus 100 according to the embodiment of the present disclosure will be described with reference to FIG. 7. FIG. 7 is a flowchart illustrating an example of the question answering processing according to the embodiment of the present disclosure. As described above, the question answering apparatus 100 at the time of the question answering includes each functional unit illustrated in FIG. 1.

Step S301: The input unit 102 inputs a document and a question.

The subsequent step S302 to step S311 are the same as step S202 to step S211 in FIG. 6, respectively, and thus the description will be omitted. However, the parameters learned in the learning processing are used as the parameters of the neural network.

Step S312: The answer generation unit 107 uses the calculated vector $o_k$ in step S311 to select the output word $y_k$ from the vocabulary V'.

For example, the answer generation unit 107 selects the word corresponding to the element with the maximum score among the elements $o_{k,n}$ of the vector $o_k$, from the vocabulary V', and sets the selected word as the output word $y_k$. The word corresponding to the element $o_{k,n}$ having the maximum score is the word having the maximum probability $p(y_k|y_{<k}, X)$ when the word is selected as the output word $y_k$.

The answer generation unit 107, in addition to the above, for example, may select the output word $y_k$ by the sampling from the vocabulary V' according to the probability distribution $p(y_k|y_{<k}, X)$.

Accordingly, by using a learned neural network that identifies whether the output word $y_k$ is included in the vocabulary B (that is, a vocabulary composed of words included in a document and a question), the probability distribution $p(y_k|y_{<k}, X)$ corresponding to the output word $y_k$ can be increased or decreased for each k. Accordingly, the word included in the vocabulary B can be accurately selected as the output word $y_k$ included in the answer sentence.

Step S313: The answer generation unit 107 judges whether the special word </s> representing the end of the sentence is selected as the output word $y_k$ in step S312 described above. When it is judged that the special word </s> is not selected as the output word $y_k$, the question answering apparatus 100 executes processing of step S314. Accordingly, the processing of step S306 to step S312 is repeatedly executed until the special word </s> is selected as the output word $y_k$ for each k (k=1, 2, . . . ). On the other hand, when it is judged that the special word </s> is selected as the output word $y_k$, the question answering apparatus 100 executes processing of step S315.

The subsequent step S314 is the same as step S213 in FIG. 6, respectively, and thus the description will be omitted.

Step S315: The answer generation unit 107 generates the answer sentence including the output word $y_k$ (k=0, 1, 2, . . . ). Accordingly, the answer sentence to the document and the question input in step S301 is generated.

Step S316: The output unit 108 outputs the answer sentence generated in step S315 to a predetermined output destination.

Summary

As described above, when an arbitrary document and an arbitrary question to the document is given, the question answering apparatus 100 according to the embodiment of the present disclosure even uses the words included in the given document and question to generate an answer sentence by a sentence generation technology using a neural network. Accordingly, in the question answering apparatus 100 according to the embodiment of the present disclosure, for example, a situation where an unknown word is included in an answer sentence to the given document and question can be significantly reduced, and thus question answering with high accuracy can be achieved.

The present disclosure is not limited to the above-described embodiment specifically disclosed, and various modifications and changes can be made without departing from the scope of the claims.

REFERENCE SIGNS LIST

100 Question answering apparatus
101 Word vector storage unit
102 Input unit
103 Word sequence coding unit
104 Word sequence matching unit
105 Document gaze unit
106 Question gaze unit
107 Answer generation unit
108 Output unit
109 Parameter update unit

The invention claimed is:

1. A computer-implemented method for processing a query, the method comprising:
receiving a document;
receiving a question;
receiving a first vocabulary, wherein the first vocabulary includes a predefined set of words;
generating, based on words in the received document and the received question, a second vocabulary;
generating, using a learnt model based on one or more words in a union of the first vocabulary and the second vocabulary, an answer sentence,
wherein the learnt model comprises a learnt neural network determining whether the second vocabulary includes a word in the answer sentence, and
wherein the learnt neural network, based on whether the second vocabulary includes the word in the answer sentence, determines a probability of selecting a word from the second vocabulary for generating the answer sentence; and
providing the generated answer sentence in response to the received question.

2. The computer-implemented method of claim 1, the method further comprising:
generating, based on a first sequence of word vectors of words in the document and a second sequence of word vectors of words in the question, a matching matrix;
generating, based on the matching matrix, a first gaze of words in the document, wherein the first gaze includes a gaze score of a word of the words in the document;
generating, based on the matching matrix, a second gaze of words in the question; and
generating, based on a first distribution of the first gaze and a second distribution of the second gaze, a distribution of the probability of selecting the word, and wherein the probability of selecting the word from the second vocabulary for generating the answer sentence relates to the distribution of the probability of selecting the word.

3. The computer-implemented method of claim 2, wherein the first gaze of words includes a first gaze distribution of one of the words in the document, and wherein the second gaze of words includes a second gaze distribution of one of the words in the question.

4. The computer-implemented method of claim 2, the method further comprising:
generating the matching matrix using a bidirectional long short-term memory of a recurrent neural network.

5. The computer-implemented method of claim 1, the method further comprising:
receiving a training document;
receiving a training question;
receiving a correct answer sentence for the training question;
generating, using the learnt neural network, a probability distribution, wherein the probability distribution relates to a probability of words in a union of the predefined first vocabulary and a third vocabulary including a word selected for a candidate answer sentence, wherein the third vocabulary includes words in the training document and the training question, and wherein the candidate answer sentence relates to responding to the training question; and
determining, based on a loss relating to the correct answer sentence and the generated probability distribution, a parameter; and
updating, based on the determined parameter, the learnt neural network.

6. The computer-implemented method of claim 5, the method further comprising:
receiving a plurality of correct answers, wherein the plurality of the correct answer sentences include the correct answer sentence;
determining, based on the plurality of correct answer sentences and the generated probability distribution, a plurality of losses;
determining an average value of the plurality of losses; and
determining, based at least on the average value of the plurality of losses, the parameter.

7. The computer-implemented method of claim 1, the method further comprising:
selecting, based on the probability of selecting the word from the second vocabulary, the word from the second vocabulary for the answer sentence.

8. A system for processing a question, the system comprises:
a processor; and
a memory storing computer-executable instructions that when executed by the processor cause the system to:
receive a document;
receive a question;
receive a first vocabulary, wherein the first vocabulary includes a predefined set of words;
generate, based on words in the received document and the received question, a second vocabulary;
generate, using a learnt model based on one or more words in a union of the first vocabulary and the second vocabulary, an answer sentence,
wherein the learnt model comprises a learnt neural network determining whether the second vocabulary includes a word in the answer sentence, and
wherein the learnt neural network, based on whether the second vocabulary includes the word in the answer sentence, determines a probability of selecting a word from the second vocabulary for generating the answer sentence; and
provide the generated answer sentence in response to the received question.

9. The system of claim 8, the computer-executable instructions when executed further causing the system to:
generate, based on a first sequence of word vectors of words in the document and a second sequence of word vectors of words in the question, a matching matrix;
generate, based on the matching matrix, a first gaze of words in the document, wherein the first gaze includes a gaze score of a word of the words in the document;
generate, based on the matching matrix, a second gaze of words in the question; and
generate, based on a first distribution of the first gaze and a second distribution of the second gaze, a distribution of the probability of selecting the word, and wherein the probability of selecting the word from the second vocabulary for generating the answer sentence relates to the distribution of the probability of selecting the word.

10. The system of claim 9, wherein the first gaze of words includes a first gaze distribution of one of the words in the document, and wherein the second gaze of words includes a second gaze distribution of one of the words in the question.

11. The system of claim 9, the computer-executable instructions when executed further causing the system to:
generate the matching matrix using a bidirectional long short-term memory of a recurrent neural network.

12. The system of claim 8, the computer-executable instructions when executed further causing the system to:
receive a training document;
receive a training question;
receive a correct answer sentence for the training question;
generate, using the learnt neural network, a probability distribution, wherein the probability distribution relates to a probability of words in a union of the predefined first vocabulary and a third vocabulary including a word selected for a candidate answer sentence, wherein the third vocabulary includes words in the training document and the training question, and wherein the candidate answer sentence relates to responding to the training question; and
determine, based on a loss relating to the correct answer sentence and the generated probability distribution, a parameter; and
update, based on the determined parameter, the learnt neural network.

13. The system of claim 12, the computer-executable instructions when executed further causing the system to:
receive a plurality of correct answers, wherein the plurality of the correct answer sentences include the correct answer sentence;
determine, based on the plurality of correct answer sentences and the generated probability distribution, a plurality of losses;
determine an average value of the plurality of losses; and
determine, based at least on the average value of the plurality of losses, the parameter.

14. The system of claim 8, the computer-executable instructions when executed further causing the system to:
select, based on the probability of selecting the word from the second vocabulary, the word from the second vocabulary for the answer sentence.

15. A computer-readable non-transitory recording medium storing computer-executable instructions that when executed by a processor cause a computer system to:
receive a document;
receive a question;
receive a first vocabulary, wherein the first vocabulary includes a predefined set of words;
generate, based on words in the received document and the received question, a second vocabulary;
generate, using a learnt model based on one or more words in a union of the first vocabulary and the second vocabulary, an answer sentence,
wherein the learnt model comprises a learnt neural network determining whether the second vocabulary includes a word in the answer sentence, and
wherein the learnt neural network, based on whether the second vocabulary includes the word in the answer sentence, determines a probability of selecting a word from the second vocabulary for generating the answer sentence; and
provide the generated answer sentence in response to the received question.

16. The computer-readable non-transitory recording medium of claim 15, the computer-executable instructions when executed further causing the system to:
generate, based on a first sequence of word vectors of words in the document and a second sequence of word vectors of words in the question, a matching matrix;
generate, based on the matching matrix, a first gaze of words in the document, wherein the first gaze includes a gaze score of a word of the words in the document;
generate, based on the matching matrix, a second gaze of words in the question; and
generate, based on a first distribution of the first gaze and a second distribution of the second gaze, a distribution of the probability of selecting the word, and wherein the probability of selecting the word from the second vocabulary for generating the answer sentence relates to the distribution of the probability of selecting the word.

17. The computer-readable non-transitory recording medium of claim 16, wherein the first gaze of words includes a first gaze distribution of one of the words in the document, and wherein the second gaze of words includes a second gaze distribution of one of the words in the question.

18. The computer-readable non-transitory recording medium of claim 16, the computer-executable instructions when executed further causing the system to:

receive a plurality of correct answers, wherein the plurality of the correct answer sentences include the correct answer sentence;

determine, based on the plurality of correct answer sentences and the generated probability distribution, a plurality of losses;

determine an average value of the plurality of losses; and determine, based at least on the average value of the plurality of losses, the parameter.

19. The computer-readable non-transitory recording medium of claim 15, the computer-executable instructions when executed further causing the system to:

receive a training document;

receive a training question;

receive a correct answer sentence for the training question;

generate, using the learnt neural network, a probability distribution, wherein the probability distribution relates to a probability of words in a union of the predefined first vocabulary and a third vocabulary including a word selected for a candidate answer sentence, wherein the third vocabulary includes words in the training document and the training question, and wherein the candidate answer sentence relates to responding to the training question; and determine, based on a loss relating to the correct answer sentence and the generated probability distribution, a parameter; and update, based on the determined parameter, the learnt neural network.

20. The computer-readable non-transitory recording medium of claim 15, the computer-executable instructions when executed further causing the system to:

select, based on the probability of selecting the word from the second vocabulary, the word from the second vocabulary for the answer sentence.

* * * * *